Dec. 30, 1969  O. D. TIBBETTS  3,487,292
SYSTEM FOR THE CONTROL OF SILICON CONTROLLED RECTIFIERS
Filed Aug. 12, 1964  2 Sheets-Sheet 1

INVENTOR.
OWEN D. TIBBETTS
BY
ATTORNEY

United States Patent Office 3,487,292
Patented Dec. 30, 1969

3,487,292
SYSTEM FOR THE CONTROL OF SILICON CONTROLLED RECTIFIERS
Owen D. Tibbetts, Tulsa, Okla., assignor to Combustion Engineering, Inc., New York, N.Y., a corporation of Delaware
Filed Aug. 12, 1964, Ser. No. 389,013
Int. Cl. H02m 5/10, 5/22
U.S. Cl. 323—22
1 Claim

ABSTRACT OF THE DISCLOSURE

A step-down transformer is connected to a source to supply current to a load. A step-up transformer is connected to a control system for the supply current. A graph is provided to illustrate that the amplitude of each half-wave of control voltage is increased while the amplitude of the load voltage is correspondingly reduced to give improved control over the current to the load.

---

Figure 1:
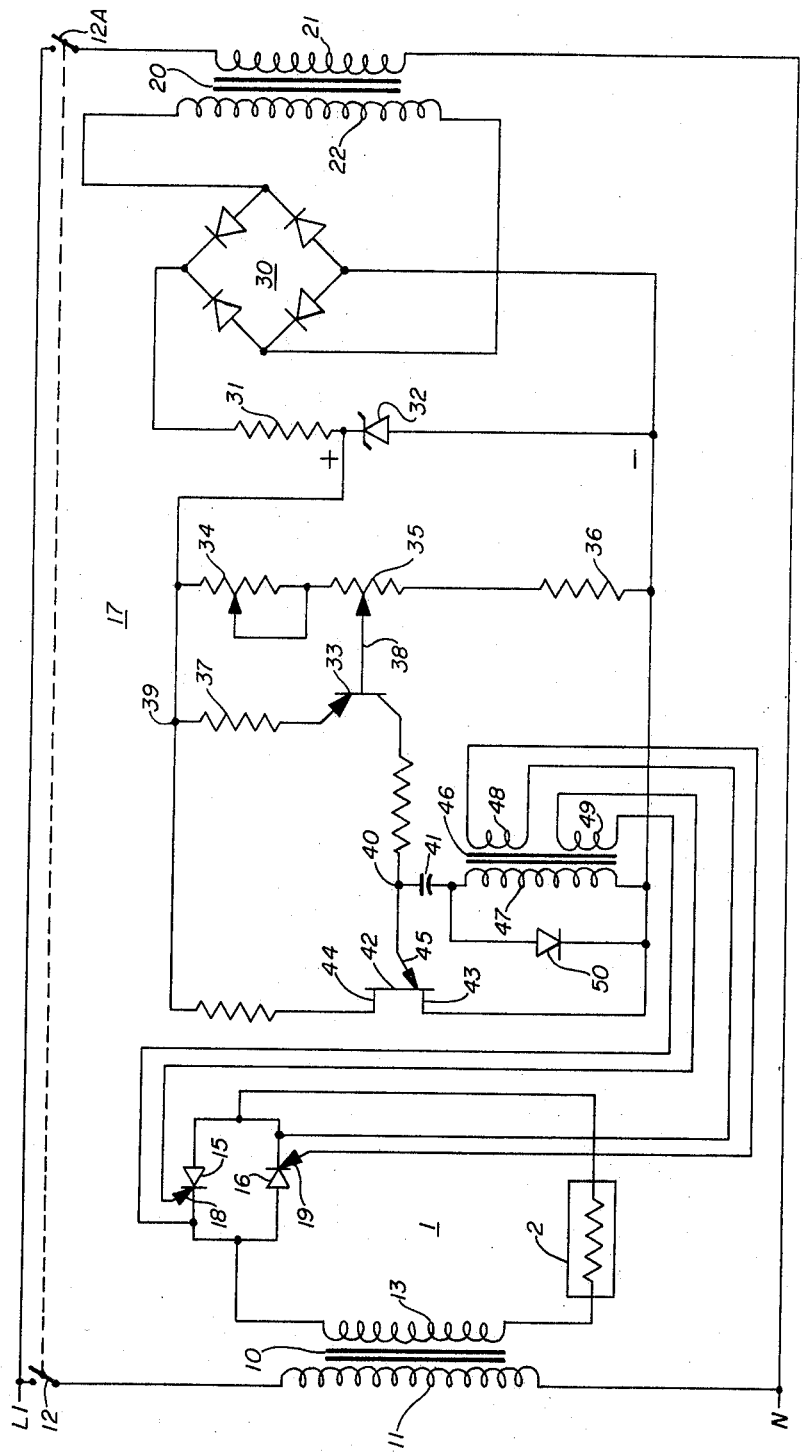

The present invention relates to the control of load circuits utilizing silicon controlled rectifiers. More specifically, the invention relates to a circuit with which to supply a voltage pulse to silicon controlled rectifiers, regulating current passage through the rectifiers, the need for control being most critical at each end of the half-cycle of voltage across the rectifiers.

The silicon controlled rectifier is a recently developed solid state electrical device for current regulation and is comparable in function to the electron tube thyratron. These rectifiers have an anode, cathode and gate. Voltage pulses are applied between the gate and cathode while a forward voltage is applied from the anode to cathode to place the rectifier in a state of high conduction. These rectifiers, when placed in load circuits, regulate the current circulated in the circuits in accordance with voltage pulses applied to their gates. A trigger circuit is provided to develop the control voltage pulses applied to these gates.

If a non-steady-state variation of voltage and current (transient) occurs in the forward voltage, these rectifiers may go into conduction. Also, transients in the trigger circuit may develop a control voltage pulse at an undesired time and place the rectifier in a conductive state. Obviously, it is desirable to guard these circuits against transients which will cause the circuits to deliver power in unregulated amounts.

When a relaxation type of trigger circuit is provided for gate control of these rectifiers, it can be supplied a voltage of trapezoidal wave form by the use of a Zener diode. A goodly percentage of possible transients do not appear in this voltage form. However, the Zenered form of voltage wave is not vertical at its ends because of the sine function of the alternating current voltage. The ends approach the vertical if a sine wave of the supply is increased in magnitude. The closer to the vertical, the greater the elimination of transients in the Zenered form of the voltage waves for supply of the gating circuit. Therefore, the present invention addresses itself to providing a voltage wave form approaching a square wave configuration, when only a single source of voltage of a single magnitude is available, for the gating circuit of silicon controlled rectifiers.

A primary object of the invention is to increase the magnitude of alternating current voltage, relative to the voltage of the same phase controlled to a load through to a load through silicon controlled rectifiers, supplied the gating circuit for the rectifiers.

Another object is to produce a Zenered voltage supply for the gating circuit of a silicon controlled rectifier of substantially square wave configuration from a single source of alternating current supplied for both the gating circuit and the load circuit controlled by the gating circuit.

The present invention contemplates a single source of single phase alternating current supply for both a load circuit in which the current is regulated by silicon controlled rectifiers and as the gating circuit for the rectifiers. A step-up transformer is provided to increase the magnitude of the voltage for the gating circuit; the voltage is Zenered to give the voltage wave form of substantially square shape to enhance the positive control exerted over the firing angles of the rectifiers in the load circuit. A step-down transformer is also provided to decrease the magnitude of the voltage in the load circuit relative to the voltage for the gating circuit to thereby enhance the control by the voltage pulses on the rectifiers which pass the current from the source to the load.

Figure 2:
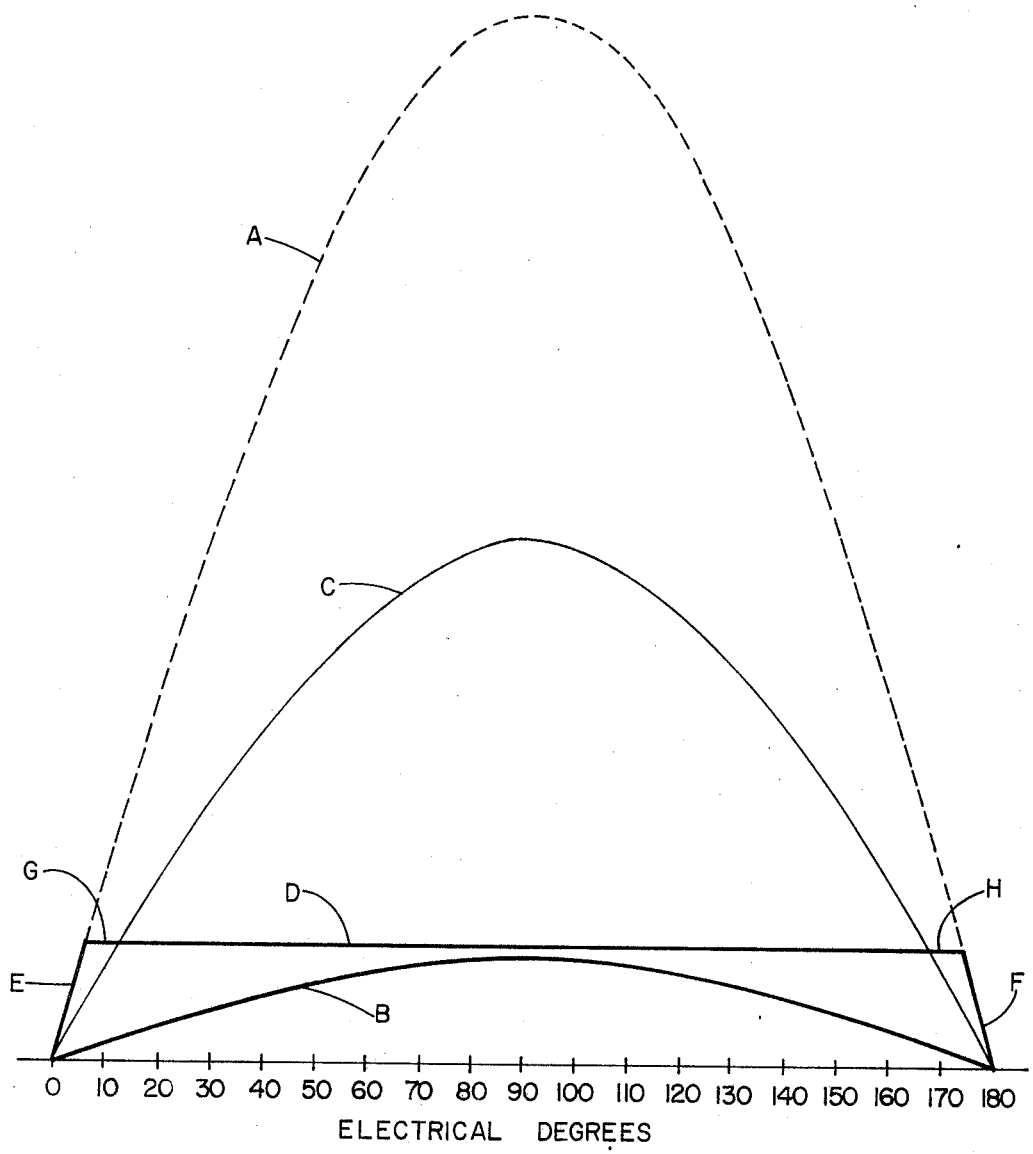

Other objects, advantages and features of this invention will become apparent to one skilled in the art upon consideration of the written specification, appended claim, and attached drawings, wherein:

FIG. 1 is a schematic illustration of a circuit controlling the firing angle of silicon controlled rectifiers and embodying the present invention; and FIG. 2 is an illustration of the wave form of voltage half-cycles in the circuit of FIG. 1.

Referring to FIG. 1, there is disclosed a schematic of a resistive load circuit 1 and trigger circuit 17 for regulation of the current passed to resistive load 2. Load 2 is representative of any unit which will receive current from the secondary winding 13 and use the current to produce power. Unit 2 could be an oven, heated by an electrical resistance, or the electro-conductive sheath of a chromatographic column.

The problem met by the present invention arises when only a single source of alternating current voltage is available. It is essential that the voltage supplied the trigger circuit be in phase with the voltage supplied the load circuit. Also, it is desired that the voltage supplied the trigger circuit be considerably greater in magnitude than the voltage supplied the load circuit. These two requirements are met if a 110–220 v., three-wire source is available. However, a single phase 110 v. two-wire or the three-phase source is often all that is available. In such instance, the present invention is valuable for being able to provide the two magnitudes of voltage required for the load circuit 1 and the trigger circuit 17, both voltages being in phase with each other.

The single phase source of an alternating current voltage available is represented by neutral line N and line L1. The primary 11 of transformer 10 is placed across this line, through the switch 12. Once the circuit 1 is connected to the primary winding 13, the circulation of current through the load 2 is regulated by silicon controlled rectifiers 15 and 16, connected in an inverse parallel configuration.

On alternate half-cycles of the alternating current voltage supplied to the circuit 1 by secondary 13, silicon controlled rectifiers 15 and 16 are alternately triggered into conduction by circuit 17 at a predetermined point of time in each half-cycle. Therefore, this symmetrical delivery of power from the alternating current voltage source results in regulation of power dissipated in the load 2 with maximum performance efficiency of the transformer 10.

TRIGGER CIRCUIT

Silicon controlled rectifiers 15 and 16 have voltage pulses delivered to their gates 18 and 19 from trigger circuit 17. These voltage pulses, delivered at the proper time, cause the silicon controlled rectifiers to go into a highly conductive state. The trigger circuit is energized by transformer 20. Transformer 20 is connected, through its primary winding 21, across neutral line N and line L1 through switch 12A. Switches 12 and 12A are mechanically actuated together.

Referring, for the moment, to FIG. 2, the relation between the shapes of the voltage waves in load circuit 1 and the supply to the trigger circuit 17 should be considered. The first requirement is that the voltage supply for the trigger circuit approach a square wave form for each half-cycle while in phase with the sine wave form of half-cycle voltage in the load circuit. Second, the square form of voltage must have sufficient magnitude to generate a triggering pulse voltage which will remain constant over the full corresponding half-cycle of the load circuit voltage. Only with uniformly high pulses of control voltage available over the full half-cycle of the controlled voltage in the load circuit can the silicon controlled rectifiers be placed in their conductive states positively near each end of the half-cycle of control power voltage in the load circuit. Additionally, forming a supply voltage in a square shape by modifying a large sine wave eliminates transients from the modified voltage shape. The result is to eliminate the effect of transients on the generation of pulses by the trigger circuit for the rectifiers.

To achieve the foregoing desired results, the alternating current voltage input to the trigger circuit 17 is increased in magnitude by a step-up transformer. In FIG. 2, curve A illustrates the magnitude of a half-cycle of voltage supplied by secondary coil 22, relative to the magnitude of a half-cycle of voltage in the load circuit 1 as illustrated by curve B. Curve C represents a half-cycle of voltage of the source to primary windings 11 and 21. Therefore, it is illustrated how transformer 10 steps this voltage down (curve B) while transformer 20 steps this voltage up (curve A).

Full wave rectifier bridge 30 is supplied the output voltage of the winding 22. The output of bridge 30 is then a full-wave rectified voltage for Zener diode 32.

The Zener diode is a well-known electrical component. The distinctive characteristic of this device, in a circuit, is that at a predetermined reverse bias voltage the unit goes into a state of high conduction, tending to maintain a constant voltage drop across the diode with large variations of reverse bias voltage exceeding this predetermined reverse bias voltage. The combination of bridge 10 and diode 32 produces a voltage having the form of a clipped full wave rectified sine wave which has a maximum value illustrated by line D (the Zenering voltage of diode 32) and may be briefly described as a trapezoidal form of wave. Resistor 31 is placed in series with diode 32 to limit the current through the diode after the predetermined reverse bias voltage has been reached and exceeded.

It is now obvious that the larger the amplitude of the rectified sine wave voltage (curve A) applied to the Zener diode, the steeper will be the sides (E and F) of the trapezoidal wave of the voltage produced. Therefore, the square wave form of voltage is approached, free of transients occurring above line D which have been clipped from the rectified sine wave voltage A by the Zener diode.

Thus, the invention provides a step-up transformer to magnify the supply of voltage for trigger circuit 17 and provides a step-down transformer to decrease the magnitude of the load voltage. This combination insures positive control of the power in the load circuit by the pulses of voltage from the trigger circuit 17 over the full range of power in the load circuit.

Again referring to FIG. 2, the voltage in the load circuit is represented by curve B. The pulses of voltage from the trigger circuit 17 are generated by the Zenered voltage D. The pulses are effective for control as long as the Zenered voltage is maintained at the constant value represented by line D. Obviously line D is extended by amplification of source voltage C. Therefore, the step-up of voltage C results in an extended range of control pulses from trigger circuit 17 near the beginning and end of the half-cycle of the controlled voltage B. Lines G and H represent this extension. At small conduction angles this extension of control represents a large percentage of the power delivered to the load.

An even further improvement of control results from stepping voltage C down to voltage B. A value for voltage B is selected which will adequately power the load. Voltage C is stepped-down to this value of voltage B and therefore smaller values of current are passed to the load under the regulation of the pulses for trigger circuit 17. This combination provides precise control over relatively small values of current delivered to the load.

Continuing with the specific operation of circuit 17 with the Zenered voltage supplied, bias for transistor 33 is developed from this voltage across resistors 34, 35, 36 and 37. The wiper 38 of resistor 35 is used to select the operating point of transistor 33. This determines the emitter-collector current flow in transistor 33. Resistor 34 is used for calibration purposes, enabling transistor 33 to be set at its cut-off point when the wiper 38 of resistor 35 is at its upper limit of travel on resistor 35. When wiper 38 is moved downward, transistor 33 is turned on harder and effective resistance between points 39 and 40 is decreased, thus placing point 40 at a higher potential and permitting capacitor 41 to charge toward this increased potential.

Transistor 42 is a unijunction transistor (or double based diode) with the following familiar characteristic: at a point determined by the voltage across base 1, 43 and base 2, 44, the voltage of the emitter 45 will cause an avalanche condition to occur between emitter 45 and base 1, 43. This voltage is known as the emitter peak potential of the device. This condition of high conduction between these points permits a relatively low impedance discharge path for capacitor 41 through the primary winding 47, of pulse transformer 46. The sudden discharge of capacitor 41 delivers a voltage pulse to the primary winding 47 of the voltage pulse transformer 46, and these voltage pulses are applied through the secondary windings 48 and 49 to the gates 18 and 19 of silicon controlled rectifiers 15 and 16 respectively.

Diode 50 is placed across the primary winding 47 of voltage pulse transformer 46 to eliminate the back E.M.F. produced by the coil at the end of the voltage pulse. This enhances the operation of the silicon controlled rectifiers by keeping pulses with a negative back-swing out of their gate circuits.

The lower the voltages between base 1, 43 and base 2, 44 the lower the voltage required on the emitter 45, to produce an avalanche condition. Therefore, as the base-to-base voltage goes to zero at the end of each half-cycle the capacitor is completely discharged.

It will be recognized that the time required for capacitor 41 to charge to the emitter peak potential of unijunction transistor 42 is a function of the resistance between points 39 and 40. Therefore, the degree of conduction of transistor 33 determines the point of time in the half-cycle where the unijunction will produce its first voltage pulse which places the silicon controlled rectifiers in their conductive state. Once the particular silicon controlled rectifier 15 and 16 is placed in its conductive state, it will pass current from the source to the load until the end of the half-cycle of the voltage from the source is reached. When the end of the half-cycle is reached, the rectifier is returned to its non-conductive state.

The foregoing operation of the trigger circiut is normally adjusted by moving wiper 38 along resistor 35. In accordance with specific operation heretofore described, movement of wiper 38 changes the point in the cycle of the alternating current voltage wave through the rectifiers at which these rectifiers go into conduction. The result is a predetermined variation of the current passed to the load through the rectifiers. The power resulting from the passage of this current through the load is thereby determined with a desired temperature being produced for the load.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. An electrical system for control of a load circuit with silicon controlled rectifiers, including,
    a single source of alternating current voltage,
    a load connected in series with the source through a stepdown transformer,
    a pair of silicon controlled rectifiers connected to each other in inverse parallel configuration and in series with the source and load,
    a step-up transformer connected to the source,
    a full-wave rectifier connected to the primary to provide an alternating current voltage with a magnitude greater than the magnitude of the voltage of the source,
    a Zener diode connected to the output of the full-wave rectifier to produce a voltage having the form of a clipped full wave rectified sine wave closely approaching a square wave,
    a relaxation circuit connected across the Zener diode and producing voltage pulses, and
    a connection between the relaxation circuit and the silicon controlled rectifier gating circiuts,
whereby the rectifiers are placed in their conductive states as predetermined points of time in the half-cycle of alternating current voltage of the source appearing across the rectifiers in the load circuit to deliver a predetermined portion of power to the load in the circuit.

References Cited

UNITED STATES PATENTS

| | | |
|---|---|---|
| 3,213,351 | 10/1965 | Walker. |
| 3,299,341 | 1/1967 | Corey. |
| 3,316,477 | 4/1967 | Shrider et al. |
| 3,304,487 | 2/1967 | McCaskey _____ 323—22 |
| 3,226,627 | 12/1965 | Fromkin _____ 323—22 |
| 3,177,418 | 4/1965 | Meng _____ 323—22 |
| 3,146,392 | 8/1964 | Sylvan _____ 323—22 |

LEE T. HIX, Primary Examiner

W. M. SHOOP, Jr., Assistant Examiner

U.S. Cl. X.R.

307—252; 323—24, 34